United States Patent
Tuna et al.

(10) Patent No.: US 12,353,849 B2
(45) Date of Patent: Jul. 8, 2025

(54) CLIENT-SIDE MACHINE LEARNING DEVELOPMENT ENVIRONMENT

(71) Applicant: ServiceNow, Inc., Santa Clara, CA (US)

(72) Inventors: Tayfun Tuna, Santa Clara, CA (US); Sunny R. Chopra, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 104 days.

(21) Appl. No.: 18/199,283

(22) Filed: May 18, 2023

(65) Prior Publication Data
US 2024/0385809 A1    Nov. 21, 2024

(51) Int. Cl.
*G06F 16/435* (2019.01)
*G06F 8/30* (2018.01)
*G06F 8/34* (2018.01)
*G06F 16/17* (2019.01)
*G06F 16/2452* (2019.01)
(Continued)

(52) U.S. Cl.
CPC .................. *G06F 8/31* (2013.01); *G06F 8/34* (2013.01); *G06F 16/248* (2019.01); *G06F 8/41* (2013.01); *G06F 8/447* (2013.01); *G06F 8/51* (2013.01); *G06F 16/176* (2019.01); *G06F 16/183* (2019.01); *G06F 16/215* (2019.01); *G06F 16/2365* (2019.01); *G06F 16/24* (2019.01); *G06F 16/2425* (2019.01); *G06F 16/2448* (2019.01); *G06F 16/2452* (2019.01); *G06F 16/24524* (2019.01); *G06F 16/24554* (2019.01);
(Continued)

(58) Field of Classification Search
CPC ..... G06F 8/31; G06F 8/34; G06F 8/51; G06F 8/41; G06F 8/447; G06F 16/248; G06F 16/2425; G06F 16/24; G06F 16/55; G06F 16/2365; G06F 16/176; G06F 16/2457; G06F 16/24524; G06F 16/183; G06F 16/215; G06F 16/2452; G06F 16/24554; G06F 16/2448; G06N 3/08
See application file for complete search history.

(56) References Cited

U.S. PATENT DOCUMENTS 10,452,650 B1 * 10/2019 Monaharan ......... G06F 16/2445
11,567,735 B1 * 1/2023 Kulkarni ........... G06F 16/24534
(Continued)

OTHER PUBLICATIONS

Akshit J. Dhruv et al., Python: The Most Advanced Programming Language for Computer Science Applications, 2020, [Retrieved on May 5, 2025]. Retrieved from the internet: <URL: https://www.scitepress.org/Papers/2020/103079/103079.pdf> 8 Pages (292-299) (Year: 2020).*

*Primary Examiner* — Anibal Rivera
(74) *Attorney, Agent, or Firm* — McDonnell Boehnen Hulbert & Berghoff LLP

(57) ABSTRACT

A specification of a data query received via a first section of a user interface is received at a client device. Query result data of the data query is received using a first programming language. A data structure storing at least a portion of the query result data is generated at the client device for a second programming language different from the first programming language. A specification in the second programming language of user code utilizing the generated data structure is received via a second section of the user interface. A program of the user code specified in the second programming language is executed at the client device.

20 Claims, 8 Drawing Sheets

(51) Int. Cl.
G06F 16/2457 (2019.01)
G06F 16/248 (2019.01)
G06F 8/41 (2018.01)
G06F 8/51 (2018.01)
G06F 16/176 (2019.01)
G06F 16/182 (2019.01)
G06F 16/215 (2019.01)
G06F 16/23 (2019.01)
G06F 16/24 (2019.01)
G06F 16/242 (2019.01)
G06F 16/2455 (2019.01)
G06F 16/55 (2019.01)
G06N 3/08 (2023.01)

(52) U.S. Cl.
CPC .......... *G06F 16/2457* (2019.01); *G06F 16/55* (2019.01); *G06N 3/08* (2013.01)

(56) References Cited

U.S. PATENT DOCUMENTS

| | | | |
|---|---|---|---|
| 2004/0098359 A1* | 5/2004 | Bayliss | G06F 16/2471 |
| 2022/0035611 A1* | 2/2022 | Cseri | G06F 16/2448 |
| 2022/0308848 A1* | 9/2022 | Clement | G06F 8/51 |
| 2023/0334039 A1* | 10/2023 | Arora | G06F 16/2457 |
| 2023/0351051 A1* | 11/2023 | Woo | G06Q 50/18 |
| 2024/0346254 A1* | 10/2024 | Liu | G06F 40/40 |

\* cited by examiner

CLIENT-SIDE MACHINE LEARNING DEVELOPMENT ENVIRONMENT

BACKGROUND OF THE INVENTION

Results can be extracted from datasets, and in particular large datasets, by interpreting insights from the collected data. For example, large datasets can be analyzed by applying machine learning techniques. Typically, machine learning involves training a prediction model using one or more disparate and large datasets. Once trained, a machine learning model can be used to perform predictions to solve a machine learning problem. Based on the particular machine learning problem, different machine learning models and different machine learning operations can be utilized.

BRIEF DESCRIPTION OF THE DRAWINGS

Various embodiments of the invention are disclosed in the following detailed description and the accompanying drawings.

DETAILED DESCRIPTION

Figure 1:
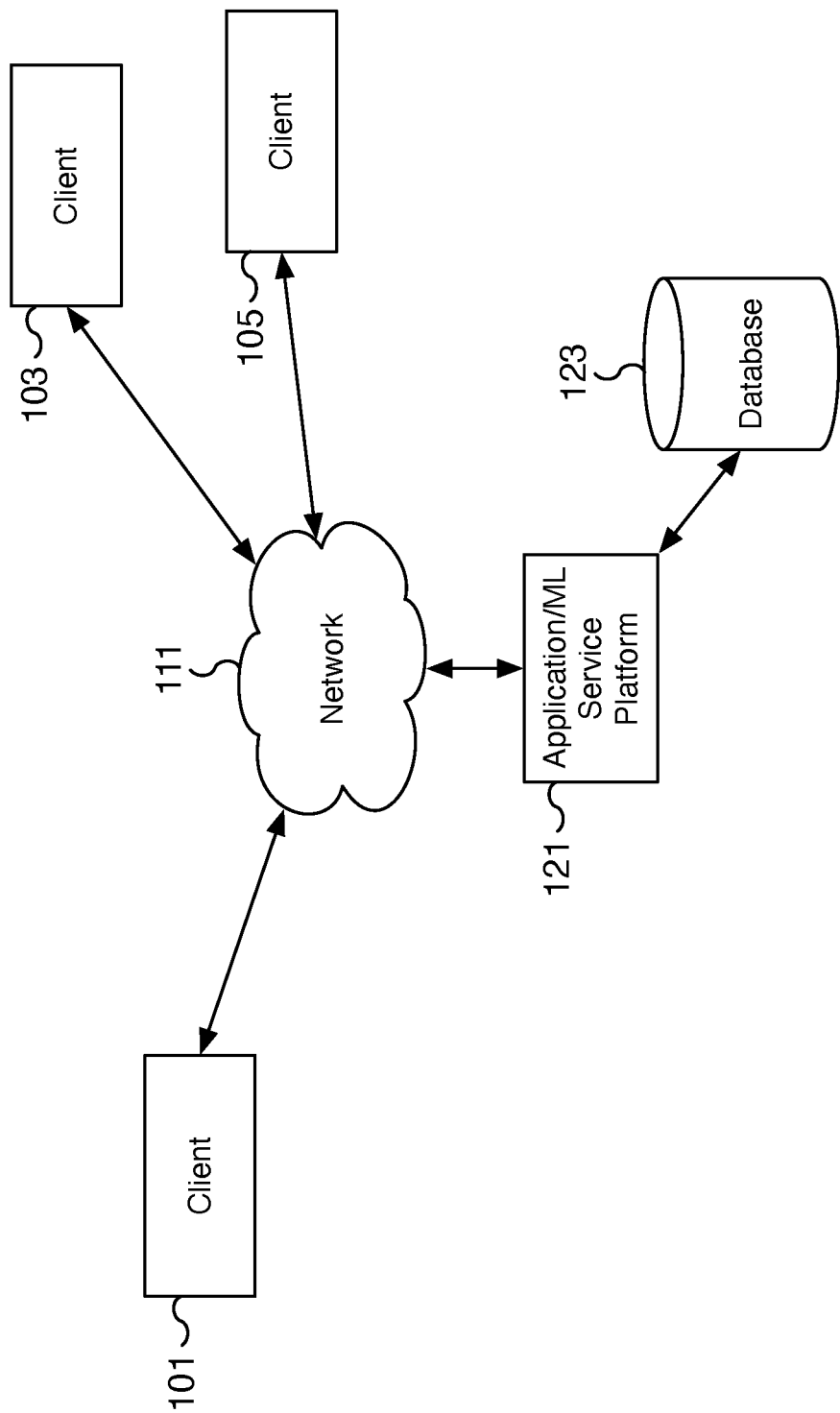
FIG. 1 is a block diagram illustrating an example of a network environment of a machine learning platform and service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A client-side machine learning development environment is disclosed. Using the disclosed development environment, the development of machine learning and data analysis applications can be performed on a client by first retrieving the relevant dataset from a remote data store. For example, a cloud-based machine learning service can provide a user interface for performing client-side machine learning development. Using the provided user interface, a data query can be provided that retrieves a remotely stored dataset. For example, a list of available and accessible data resources, such as databases and corresponding tables and columns, can be displayed in the client development environment and a data query to retrieve the desired entries can be provided. The provided data query is executed by the machine learning service and the resulting data results are returned to the client. In various embodiments, the client-side environment converts the data results from a web-based programming language used to implement the client environment to a second programming language used for performing machine learning analysis. The client development environment can include a user interface view for viewing the retrieved dataset such as a user interface view for displaying a portion of the retrieved data in table form with the appropriate column header names and the ability to navigate through the retrieved data entries.

In various embodiments, machine learning and/or data analysis programming code written in the second programming language is executed on the client to analyze the retrieved data. The second programming language is a programming language appropriate for machine learning analysis and overcomes limitations of the first programming language that is typically used for web programming. In some embodiments, the client user interface includes a user interface view for developing the machine learning and/or data analysis code to be executed on the retrieved data as well as a user interface view for viewing the program execution results. For example, the program code can be modified and revised within a program code view and once executed, the results from execution, including text-based and graphical results, can be displayed in an execution results view of the client user interface. In various embodiments, a user can quickly iterate on a machine learning and/or data analysis program by loading or entering the corresponding program code using the client environment followed by initiating the execution of the current code, viewing the execution results, making the appropriate modifications to the program code, and then executing the revised version of the program code all from within the client user interface. In the disclosed embodiments, the execution of the machine learning and/or data analysis program is performed on the client device using client resources with the retrieved data as an input source without requiring access to remote machine learning hardware such as machine learning training or prediction servers.

In various embodiments, the disclosed client-side machine learning development environment provides a client-side solution for performing machine learning and data analysis, which allows for the rapid iteration and improvement of machine learning and data analysis programs. The client-side environment can include a customized user interface that securely loads a dataset from a remote server. For example, a user, such as a developer or data scientist, must first provide the appropriate credentials to gain access and retrieve the desired datasets stored by a machine learning service. The machine learning and/or data analysis is then performed on the retrieved dataset via a client-side machine learning development user interface. The machine learning analysis user interface can include multiple user interface views. For example, a data query view can be provided to allow the user to create a data query for retrieving the relevant dataset. A data query results view can be provided that allows the user to visually preview and navigate through the contents of the data query results. A program code view can be provided that allows the user to compose machine learning and/or data analysis code using a machine learning programming language such as Python. An execution results view can be provided that displays the results of executing, using only client hardware resources, the machine learning and data analysis code on the retrieved dataset. Executing the machine learning and data analysis code on the client avoids many of the issues that arise from relying on server-side machine learning hardware, such as resource contention and an asynchronous development workflow.

In some embodiments, a specification of a data query received via a first section of a user interface is received at a client device. For example, a user accesses and is provided with a user interface to a machine learning service via a client device. The machine learning service can be made accessible via a web browser and the provided user interface to the service is run on the client device. Using a data query section of the provided client user interface, a user composes and submits a data query such as one corresponding to a database query that targets retrieving a specific dataset. In some embodiments, query result data of the data query is received using a first programming language. For example, the query is executed and the results of the query are returned by the machine learning service. The data query results are received at the client device by the client user interface using a first programming language such as the programming language used to create the client user interface. In some embodiments, the client user interface is written at least in part using the first programming language and the first programming language is language such as JavaScript.

In some embodiments, a data structure storing at least a portion of the query result data is generated at the client device for a second programming language different from the first programming language. For example, the query results are converted from a data structure in the first programming language to a data structure in a second programming language. The second programming language can be a programming language used for machine learning, such as Python or another appropriate language that supports machine learning operations. In some embodiments, a specification in the second programming language of user code utilizing the generated data structure is received via a second section of the user interface. For example, a second section of the client user interface is a program code development environment that allows the user to enter and modify programming code for performing machine learning and data analysis on the retrieved query result data. The second section of the client user interface can be configured to allow the user to edit, modify, and execute program code that addresses the retrieved query result data via the generated data structure using the second programming language.

In some embodiments, a program of the user code specified in the second programming language is executed at the client device. For example, the program code specified in the program code development environment of the client user interface is executed using the hardware of the client device. Instead of requiring a remote machine learning server to execute the program code, the code is instead executed locally on the client. In some embodiments, the program code is executed in the web browser running the client user interface. For example, the program code can be converted from the second programming language into a binary instruction format capable of being executed by the browser application, such as in a web browser virtual machine. In various embodiments, the results of the program execution are displayed in the client user interface, such as in a results section of the user interface. The results can include both text-based and graphical results such as plots, figures, and charts.

FIG. 1 is a block diagram illustrating an example of a network environment of a machine learning platform and service. In the example shown, clients 101, 103, and 105 access cloud-based machine learning services hosted by application and machine learning service platform 121 via network 111. Network 111 can be a public or private network. In some embodiments, network 111 is a public network such as the Internet. In various embodiments, clients 101, 103, and 105 are network clients such as web browsers used for accessing web-based cloud services. Application and machine learning service platform 121 provides web and machine learning services including web applications such as web-based configuration management database (CMDB) services and machine learning services such as machine learning model training and machine learning prediction. In some embodiments, the web application provides a front-end to the machine learning services including a client-side machine learning development environment. For example, a machine learning service can allow a user to select customer data from a database such as database 123 for performing machine learning and data analysis tasks. Using the client-side machine learning development environment, a user interface is provided by application and machine learning service platform 121 to retrieve the requested data but the machine learning and data analysis is performed by and on the client, such as by and on clients 101, 103, and/or 105.

In various embodiments, application and machine learning service platform 121 utilizes database 123 for storing and retrieving various forms and types of data. For example, customer data is written to and retrieved from database server 123. Moreover, customer data stored in database 123 can be utilized to train a machine learning model and/or run predictions using a trained model. In some embodiments, database 123 is a relational database such as a MySQL database. In various embodiments, database 123 responds to database queries such as SQL queries originating from application and machine learning service platform 121. In particular embodiments, data from database 123 can only be accessed after a user is properly authenticated by application and machine learning service platform 121. For example, application and machine learning service platform 121 can implement access control lists and other security measures to limit and control access to data stored on database 123.

In some embodiments, application and machine learning service platform 121 is a machine learning platform offering machine learning services including a client-side machine learning development environment. Although depicted in FIG. 1 as a single element, application and machine learning service platform 121 includes multiple components including one or more servers. For example, application and machine learning service platform 121 can include one or more application servers for hosting web applications related to machine learning services. Application and machine learning service platform 121 can also include additional server-side machine learning components such as a scheduler component, one or more training server components, one or more prediction server components, and/or a machine learning model storage component. In various embodiments, each of these components can function as separate functioning components such as separate servers or data stores and need not, for example, be limited to running on the same hardware server. In various embodiments, a client such as clients 101, 103, and/or 105 can elect to utilize a client-side machine learning development environment provided by application and machine learning service platform 121 to develop and execute machine learning and data analysis program code instead of relying on corresponding shared server-side hardware. By electing to utilize a client-side machine learning development environment, the client can avoid a wait queue used to task and schedule server-side machine learning tasks or jobs. In various embodiments, application and machine learning service platform 121 includes a machine learning model data store for storing trained machine learning models as well as an interface for accessing and retrieving client data such as data stored at database 123. In some embodiments, portions of the server-side machine learning hardware are optional since once the requested data is retrieved, all machine learning and data analysis operations can be performed by the client.

As shown in FIG. 1, application and machine learning service platform 121 is accessible by multiple clients. In some embodiments, each client can be associated with a different customer and application and machine learning service platform 121 balances the security needs and requirements of multiple customers. For example, in some embodiments, multiple customers can send data query requests to be served by the machine learning services of application and machine learning service platform 121. As part of receiving a request for data at application and machine learning service platform 121, the request and corresponding user can be authenticated to enforce that only the proper clients and/or users are able to access and are provided with the requested data. In some embodiments, clients and/or users can be authenticated prior to submitting the request for data, for example, as part of a login process.

In some embodiments, cloud-based machine learning services can be implemented by pairing application and machine learning service platform 121 with one or more databases or data stores such as database 123. For example, application and machine learning service platform 121 can utilize database 123 as an input and/or output source of customer data. In some embodiments, database 123 functions as a source for training data for training a machine learning model. Database 123 can also include a database of trained machine learning models available for a specific entity or customer. In some embodiments, database 123 can be used as an input source for prediction requests by identifying a particular machine learning model to apply for a prediction request and/or input data to apply a specified model to. Database 123 can also be used to store prediction results and machine learning and data analysis program code and results. In some embodiments, database 123 is a single-entity database and is only accessible by a single customer. To support multiple customers, each additional customer accesses its own database (not shown). Although database 123 is shown distinct from application and machine learning service platform 121 in FIG. 1, in some embodiments, application and machine learning service platform 121 includes one or more databases such as database 123. In some embodiments, although database 123 is part of the application and machine learning service platform 121, database 123 may also be accessible by other services. For example, database 123 can also be a configuration management database (CMDB) used for providing CMDB services while also accessible for providing machine learning services.

Although single instances of some components have been shown to simplify the diagram, additional instances of any of the components shown in FIG. 1 may exist. For example, as previously discussed, application and machine learning service platform 121 may include one or more servers and multiple components such as training servers, prediction servers, a scheduler, and model storage (not shown). Similarly, database 123 may include one or more database servers and may not be directly connected to application and machine learning service platform 121. For example, database server 123 and its components may be replicated and/or distributed across multiple servers and/or components. In various embodiments, application and machine learning service platform 121 may host a cloud-based service that serves one or multiple customers whereas database 123 may be a single-tenant database that only stores data for one specific customer. Each customer may have a corresponding siloed database such as database 123 to maintain data separation. In some embodiments, some components of application and machine learning service platform 121 may be multi-tenant components that serve multiple customers and some components may be single tenant components that are dedicated to serving a single customer. In some embodiments, components not shown in FIG. 1 may also exist.

Figure 2:
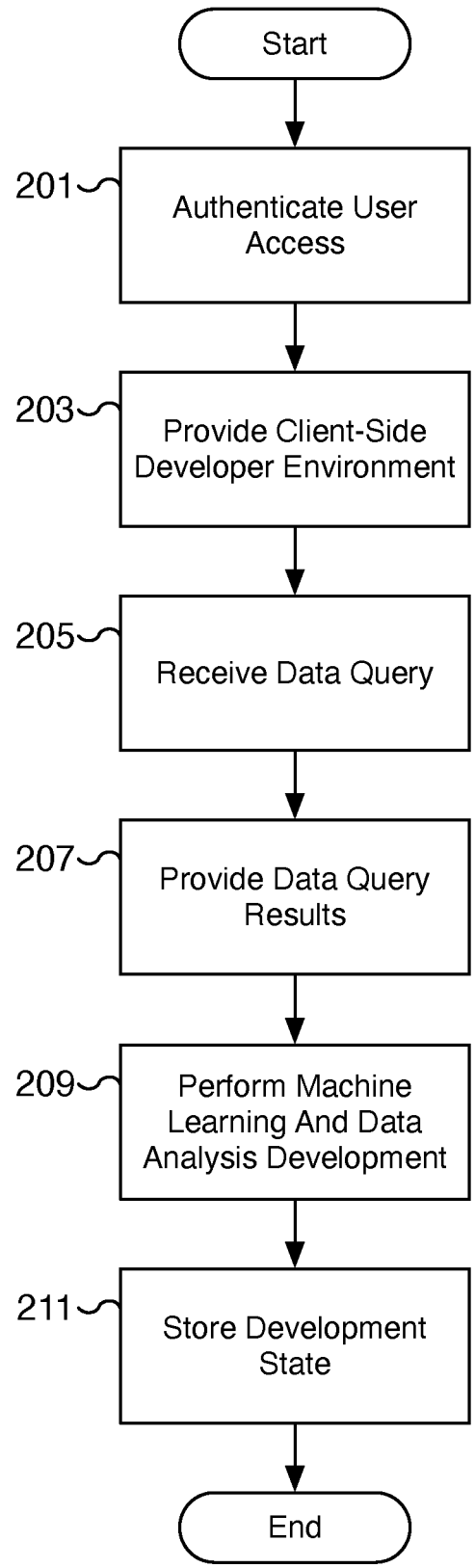
FIG. 2 is a flow chart illustrating an embodiment of a process for performing client-side machine learning development.

FIG. 2 is a flow chart illustrating an embodiment of a process for performing client-side machine learning development. For example, using the process of FIG. 2, development of machine learning and data analysis applications can be performed on a client by first retrieving the relevant dataset from an application and machine learning service platform. Once the relevant data is received at the client, the development can proceed on the client device including the iterative cycle of executing the machine learning and data analysis user code, reviewing the results of the program code execution, and revising the user code. Access to server-side hardware for executing the machine learning and data analysis user code and revising the user code is not required. In some embodiments, the process of FIG. 2 is performed by a cloud-based application and machine learning service platform and the client user interface and/or client-side machine learning development environment is provided by the application and machine learning service platform for running on the client device, such as in a web browser of the client device. In some embodiments, the application and machine learning service platform is application and machine learning service platform 121 of FIG. 1 and the client is client 101, 103, and/or 105 of FIG. 1.

At 201, user access is authenticated. For example, the user of the client device authenticates with the application and machine learning service platform. The authentication is performed to determine what data the user should be allowed to access. In various embodiments, user access is authenticated with an access control list managed at the application and machine learning service platform.

At 203, a client-side development environment is provided. For example, data used to execute a client-side machine learning development environment at the client device is provided by the application and machine learning service platform. In some embodiments, portions of the data can be cached at the client on subsequent uses and only the required portions of the client-side development environment are provided. In some embodiments, the provided client-side development environment corresponds to a web application where the relevant functionality for a machine learning and data analysis development environment is executed at the client device.

At 205, a data query is received. For example, a query for data specifying one or more tables and corresponding columns is received. In various embodiments, the data query that is received is constructed and requested using the client-side development environment. The data query received is then processed and a data query result is determined. In various embodiments, the data query is checked to confirm that the user authenticated at 201 has access to the requested data. Any data matching the data query that the user does not have access to is not included in the data query result. In some embodiments, any unauthorized request for access is logged and/or a notification of the unauthorized access is sent.

At 207, data query results are provided. For example, the data query results determined in response to the data query received at 205 are provided by the application and machine learning service platform to the client. The data query results can be provided to the client-side development environment running on the client. In various embodiments, the result is provided using a standardized transport protocol and may be formatted using a programming language designed for web application development.

At 209, machine learning and data analysis development is performed. For example, the development of machine learning and data analysis applications using the retrieved data is performed within the client-side development environment. In various embodiments, the development process is an iterative one that includes executing the user machine learning and data analysis programming code, viewing the results, and revising the user code as needed. Each of these tasks is performed within the client-side development environment and only or primarily the hardware resources of the client device. Access to remote machine learning hardware including machine learning training and prediction servers is not required. In some embodiments, the data structure storing at least a portion of the data query results is first generated by the client-side development environment using a second programming language, such as a programing language that supports operations for machine learning and data analysis. The user code developed using the client-side development environment can then reference the generated data structure using the second programming language.

In various embodiments, the user code written in the second programming language is converted to a binary format compatible with the client-side development environment. For example, the user code written in the second programming language can be used to generate binary instructions capable of being executed by a browser application running the client-side development environment. In some embodiments, the binary instructions are executed using a virtual machine and/or sandbox of the browser application. By allowing the user code to be written in the second programming language, the machine learning and data analysis development can be performed using higher level programming constructs such as those that support machine learning and data analysis operations including matrix operations. Similarly, machine learning tasks such as classification, clustering, or an anomaly detection can be implemented using the second programming language.

As part of the iterative development cycle, the disclosed client-side development environment can execute the user code to generate results including both text-based and graphical results. The graphical results can include generated figures such as charts, plots, maps, diagrams, etc. For example, the results from executing the machine learning and/or data analysis can be displayed in a histogram or another graphical figure. In various embodiments, the results are displayed by the client-side development environment such as in a results view and can be exported and/or shared.

At 211, the development state is stored. For example, the state of the development including the provided data query, user code, and generated results can be stored at and by the application and machine learning service platform. In various embodiments, the application and machine learning service platform is a cloud service that allows the user of the client-side development environment to save the state of development and to resume the development at a later time. For example, user code including versions of the user code and corresponding execution results and data queries can be stored for later retrieval.

Figure 3:
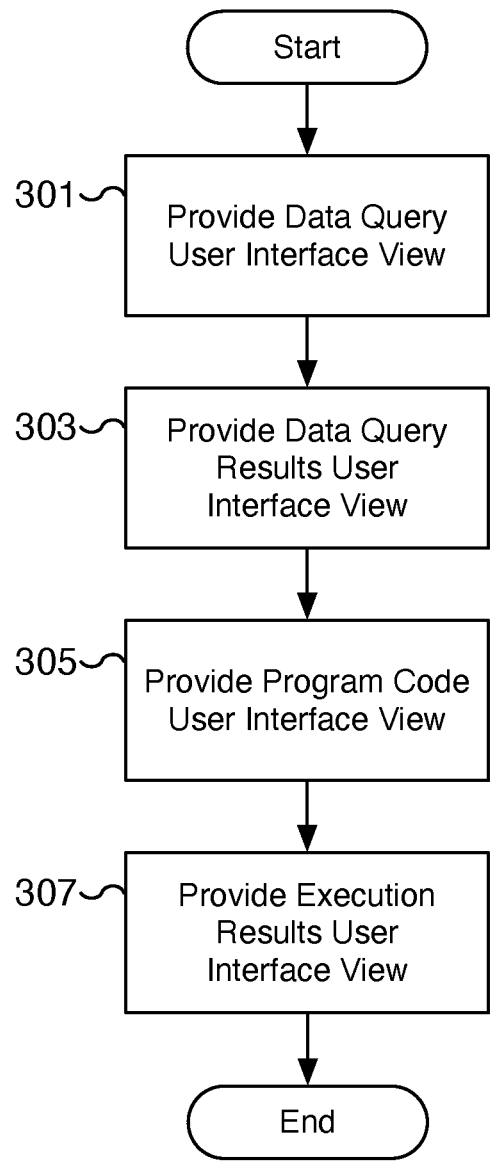
FIG. 3 is a flow chart illustrating an embodiment of a process for providing a user interface for a client-side machine learning development environment.

FIG. 3 is a flow chart illustrating an embodiment of a process for providing a user interface for a client-side machine learning development environment. For example, using the process of FIG. 3, a user interface for interacting with a client-side machine learning development environment is provided at least in part by a cloud-based application and machine learning service platform. In various embodiments, data used to construct and implement the user interface is provided via a cloud platform to the client device. The provided data can be used to load, instantiate, and/or run the client-side machine learning developer user interface. For example, the user interface can be configured to run in a browser application on the client device and the provided data can be used to define, implement, and/or execute the functionality of the user interface using the hardware resources of the client device. In some embodiments, the process of FIG. 3 is performed at 203 of FIG. 2 by a cloud-based application and machine learning service platform such as application and machine learning service platform 121 of FIG. 1 and the client hosting the user interface of the client-side machine learning development environment is client 101, 103, and/or 105 of FIG. 1.

At 301, a data query user interface view is provided. For example, a user interface view and data associated with creating the user interface view is provided for creating a data query used to retrieve a corresponding data set. In various embodiments, the data query user interface view includes at least three selection fields, one to specify one or more tables, one to specify one or more columns, and one to specify optional query parameters. Using the provided data query user interface view, a user can create a data query to retrieve a corresponding data set for performing machine learning and/or data analysis operations. In various embodiments, the data query is used to access data stored at a cloud service such as at a cloud-based application and machine learning service platform. In some embodiments, selection fields can be prepopulated with the names of tables, columns, and/or other query parameters. For example, the names of available tables accessible by the current user can be prepopulated and provided via a drop-down menu. As another example, the names of table columns can be prepopulated (or autocompleted) based on a selected table name. In some embodiments, the table names, columns names, and/or parameters are auto-completed based on available and/or accessible data tables and columns.

In some embodiments, the data query user interface view includes functionality for generating a data query based on the provided data query parameters. For example, a corresponding database query can be generated using a first programming language such as a web development language to transmit the data query from the client to a cloud-based service such as the application and machine learning service platform hosting the requested data. In some embodiments, the data query utilizes an SQL format to query the corresponding data store. In various embodiments, the data query user interface view allows the user to load the data associated with the created data query such as by selecting a "Load Data" button (or similar actionable user interface dialog) of the data query user interface view. For example, selecting the "Load Data" button will initiate the data query request.

At 303, a data query results user interface view is provided. For example, a user interface view and data associated with creating the user interface view is provided for viewing requested data associated with a data query. In various embodiments, the data query results user interface view displays at least a portion of the returned data set retrieved via a data query. The returned results can be displayed in a table format and can include table headers for the corresponding table columns. In some embodiments, data query results user interface view allows the user to manipulate and/or navigate the data query results. For example, in various embodiments, the user can scroll and/or navigate through different sets of entries of the data query results and/or apply filters and/or searches to narrow down and/or limit the displayed results. In some embodiments, the data query results are displayed in the data query results user interface view using a first programming language, such as a web development programming language, that is also used at least in part to create the data query results user interface view. In some embodiments, the results are displayed by using a second programming language, such as a programming language used for creating the machine learning and data analysis application of the client-side machine learning development environment.

In some embodiments, data query results user interface view includes one or more user interface dialogs to perform data analysis operations on the data query results. For example, preprogrammed and/or configurable data analysis operations can be executed on the data query results from the data query results user interface view. In some embodiments, the available data analysis operations are presented as and accessed via selectable operation dialogs or buttons that correspond to different data analysis operations. Example data analysis operations include performing a box plot on the data query results, finding anomalies within the data query results, finding common words or phrases within the data query results, and finding similar columns within the data query results, among other data analysis operations. In various embodiments, the results of applying the data analysis operations are displayed in an execution results user interface view.

At 305, a program code user interface view is provided. For example, a user interface view and data associated with creating the user interface view are provided for a user to load, save, enter, edit, and/or execute user programming code. For example, the program code user interface view provides a developer environment that displays the user code associated with a machine learning and/or data analysis program. In some embodiments, the user code can be loaded from and/or saved to a remote store via a cloud-based service such as an application and machine learning service platform. Moreover, the displayed user code can be edited and executed from the program code user interface view. In various embodiments, the user code can further reference the retrieved query result data using a data structure of the programming language used to develop the machine learning and/or data analysis user code. In some embodiments, the programming language is a programming language used for machine learning applications (such as the Python programming language) and the data structure used to access the query result data corresponds to the standardized variable, such as the variable "df" for data frame. In various embodiments, the program code user interface view includes a "Run" button (or similar actionable user interface dialog) to execute the user code on the client device, such as within the client-side machine learning development environment. In some embodiments, selecting the corresponding "Run" button will execute the program code in a virtual machine of the client-side machine learning development environment by first converting the program code to a binary instruction format.

At 307, an execution results user interface view is provided. For example, a user interface view and data associated with creating the user interface view are provided for viewing the results from executing the user code associated with the program code user interface view. In various embodiments, the execution results user interface view can display both text-based and graphical results. For example, the execution results user interface view can display a histogram plot with results generated by executing the user code associated with the program code user interface view. In some embodiments, the execution results user interface view allows the user to export, share, and/or save the results, for example, to a remote store via a cloud-based service such as an application and machine learning service platform. In some embodiments, the results can be exported to the local client, such as using a PDF, PNG, SVG, or another appropriate format.

Figure 4:
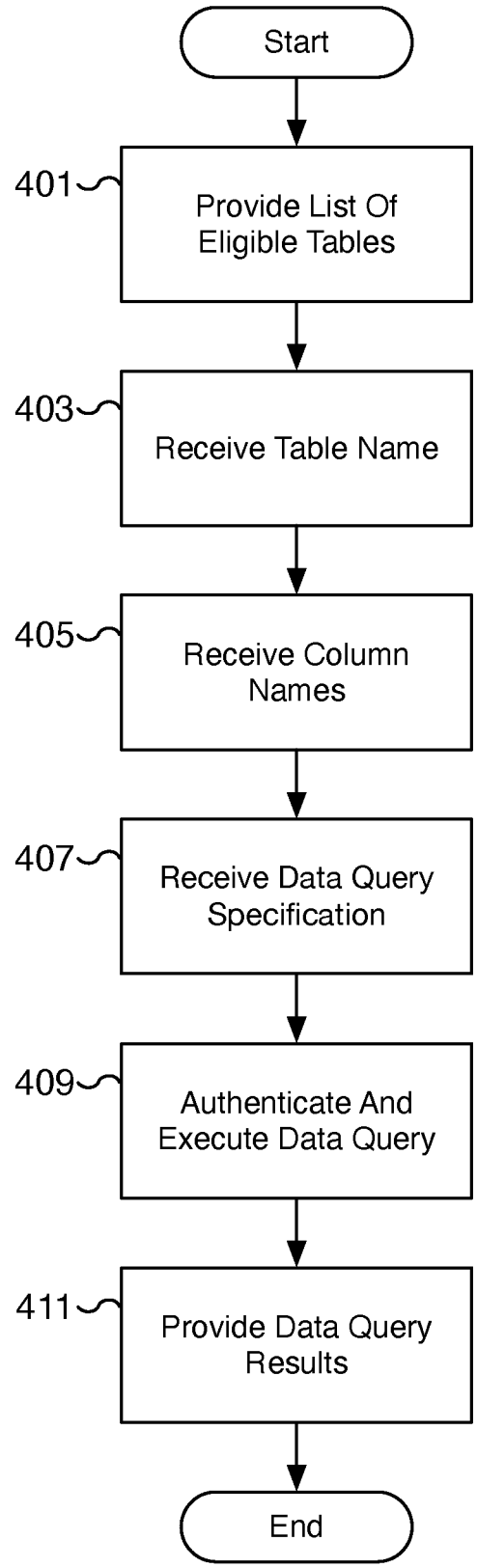
FIG. 4 is a flow chart illustrating an embodiment of a process for retrieving data using a client-side machine learning development environment to perform client-side machine learning and data analysis.

FIG. 4 is a flow chart illustrating an embodiment of a process for retrieving data using a client-side machine learning development environment to perform client-side machine learning and data analysis. For example, using the process of FIG. 4, data used for machine learning and data analysis can be provided to a client-side machine learning development environment in response to a data query request. In various embodiments, the data query request is received and processed by a cloud-based application and machine learning service platform. In response to the received data query, the application and machine learning service platform can retrieve and provide the requested data. In various embodiments, only data to which a user is previously granted access is provided in response to the data query request. For example, the client and/or user associated with the data query request is first authenticated to confirm access to the requested data. In some embodiments, the process of FIG. 4 is performed at 205 and/or 207 of FIG. 2 by a cloud-based application and machine learning service platform such as application and machine learning service platform 121 of FIG. 1 and the client receiving the requested data is client 101, 103, and/or 105 of FIG. 1.

At 401, a list of eligible tables is provided. For example, a list of tables that the user is approved to access is provided by the application and machine learning service platform to the client-side machine learning development environment. In some embodiments, the names of the eligible tables are presented via a menu of a data query user interface view of the client-side machine learning development environment and/or the list of eligible tables is used to autocomplete a partially provided table name. In some embodiments, determining the eligible tables and/or providing the list of eligible tables is an optional step. In some embodiments, the list of eligible tables is based at least in part on authenticating the user via the application and machine learning service platform.

At 403, a table name is received. For example, the name of a selected table is provided by the client-side machine learning development environment. In some embodiments, the name is provided as part of a data query transmitted by the client-side machine learning development environment to the application and machine learning service platform.

At 405, one or more column names are received. For example, one or more column names of the table name received at 403 are provided by the client-side machine learning development environment. In some embodiments, the column names are provided as part of a data query transmitted by the client-side machine learning development environment to the application and machine learning service platform.

At 407, a data query specification is received. For example, a specification describing a data query is provided by the client-side machine learning development environment. In some embodiments, the specification includes parameters of the query that are applied to the table and column names received at 403 and 405, respectively. In some embodiments, the received specification is a data query that includes the table and corresponding columns. In some embodiments, the data query can incorporate an SQL query statement used to describe the data query. In various embodiments, the data query is received by the application and machine learning service platform.

At 409, the data query is authenticated and executed. For example, a data query corresponding to the table name, columns, and specification is authenticated to confirm that the requesting user and/or client has permission to execute the data query. In the event the data query is authenticated, the data query is executed to retrieve the corresponding data result. In some embodiments, the authentication step is an optional step and user and/or data access authentication is performed at a stage when requesting the data query.

At 411, data query results are provided. For example, the results from executing the data query at 409 are provided. In some embodiments, the results are first analyzed to confirm that the user and/or client has permission to access the retrieved data. In various embodiments, the data query results are provided to the client-side machine learning development environment for analysis using machine learning and/or data analysis operations.

Figure 5:
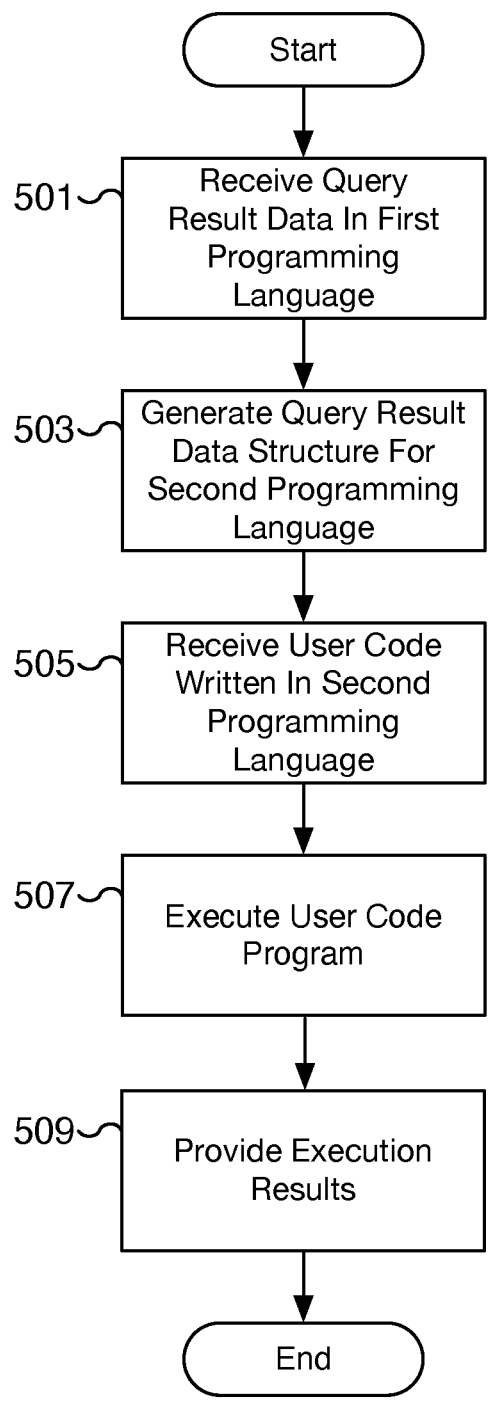
FIG. 5 is a flow chart illustrating an embodiment of a process for performing machine learning and data analysis using a client-side machine learning development environment.

FIG. 5 is a flow chart illustrating an embodiment of a process for performing machine learning and data analysis using a client-side machine learning development environment. For example, using the process of FIG. 5, machine learning and data analysis application development including the execution of machine learning and data analysis program applications can be performed using a client-side machine learning development environment. In various embodiments, the machine learning and data analysis is performed on data retrieved from a cloud-based application and machine learning service platform. In some embodiments, the process of FIG. 5 is performed at 207 and/or 209 of FIG. 2 by a client-side machine learning development environment provided via a cloud-based application and machine learning service platform such as application and machine learning service platform 121 of FIG. 1. In some embodiments, the client hosting the client-side machine learning development environment used to perform the machine learning and data analysis is client 101, 103, and/or 105 of FIG. 1.

At 501, query result data is received in a first programming language. For example, the data query result is received at the client-side machine learning development environment using a first programming language such as a web development programming language. In some embodiments, the first programming language is the JavaScript programming language and the query result data is accessed using a programming interface of the first programming language.

At 503, a query result data structure is generated for a second programming language. For example, using the query result data received at 501 in the first programming language, a query result data structure is generated in a second and different programming language. The second programming language is a programming language used for machine learning and data analysis applications (such as the Python programming language). In various embodiments, the generated data structure allows user code to access the query result data using user code written in the second programming language. For example, the generated data structure can be referenced from the user code using a standardized variable, such as the variable "df" for data frame.

At 505, user code written in the second programming language is received. For example, the user provides a user programming code that is written in the second programming language which accesses the query result data structure generated at 503. In various embodiments, the user code can be written in a programming language used for machine learning and data analysis applications and applies machine learning/data analysis operations on the data query result.

At 507, a program of the user code is executed. For example, a program of the user programming code received at 505 is prepared for execution and then executed at the client device. In some embodiments, the preparation includes compiling the user code although an interpreter can be utilized as well. In various embodiments, the user code is converted to a binary format. The converted user code can be executed in a virtual machine of the client device and/or client-side machine learning development environment. In some embodiments, the binary format is capable of being run at near native speed on the client device.

At 509, execution results are provided. For example, the results from executing the user code at 507 are provided. In some embodiments, the results are provided for viewing within the client-side machine learning development environment. The results can include text-based and graphical results. In some embodiments, the results can be further saved at a remote data store, shared, and/or exported.

Figure 6:
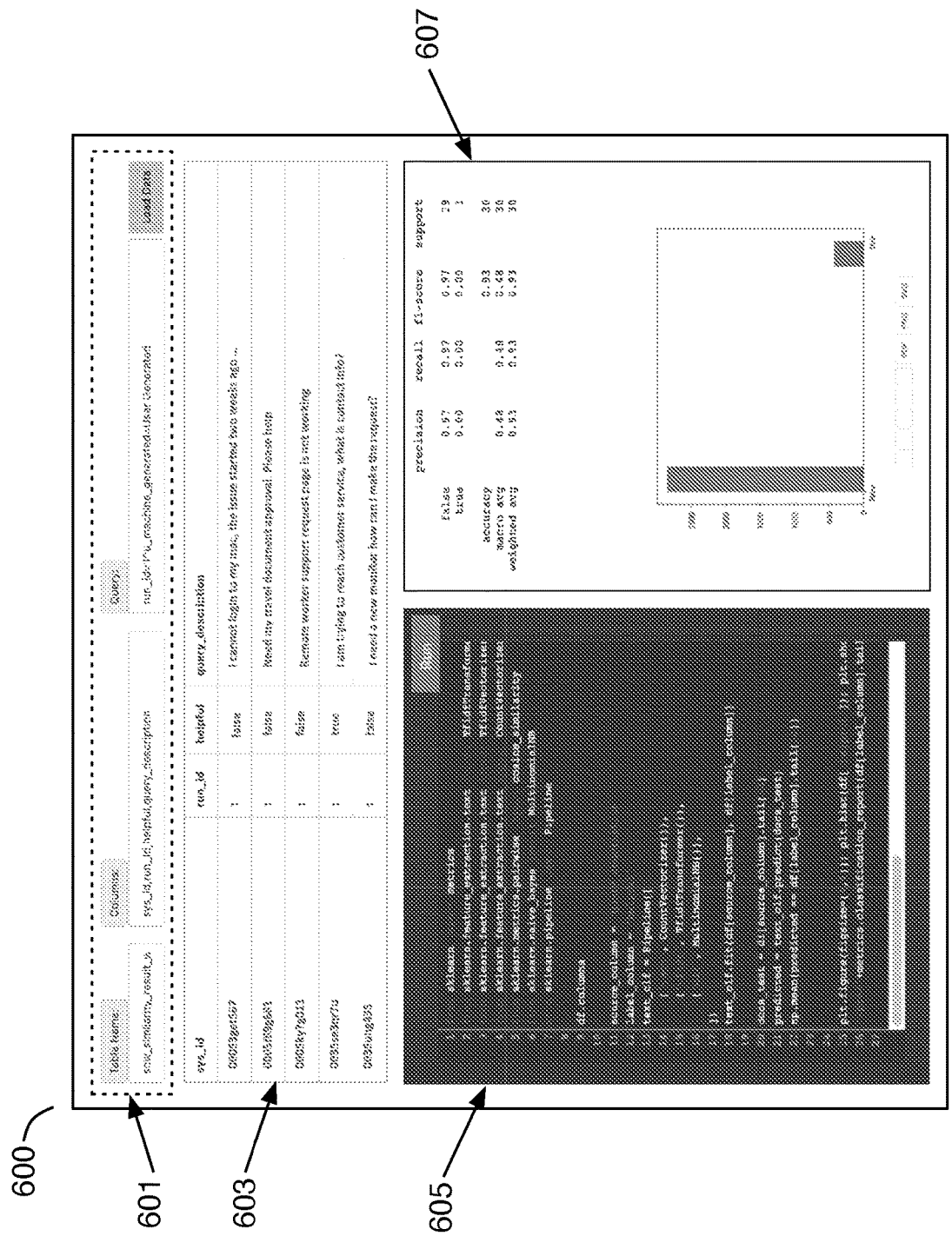
FIG. 6 is a diagram illustrating an embodiment of a user interface for client-side machine learning development.

FIG. 6 is a diagram illustrating an embodiment of a user interface for client-side machine learning development. In the example shown, user interface 600 is a user interface provided by a machine learning service for performing client-side machine learning development. In various embodiments, user interface 600 corresponds to the graphical user interface of a network application, such as a web application, and is accessed via a network client, such as a web browser. In some embodiments, user interface 600 is only accessible via the machine learning service once the user has provided the appropriate access credentials, such as via a login user interface (not shown). In the example shown, user interface 600 includes four sections, data query view 601, data query results view 603, program code view 605, and execution results view 607. In some embodiments, the machine learning service providing at least portions of the underlying client user interface used to render user interface 600 is application and machine learning service platform 121 of FIG. 1 and the client accessing user interface 600 is one or more of clients 101, 103, and/or 105 of FIG. 1. In some embodiments, user interface 600 is implemented and/or is utilized for client-side machine learning development using the processes of FIGS. 2-5.

In the example shown, user interface 600 includes four sections that allow a user to develop machine learning applications that are executed on the client device while also retrieving the relevant data set from a remote service, such as a machine learning service. In various embodiments, a data query is submitted for the desired data using data query view 601. For example, data query view 601 includes a "Table Name" field for specifying a database table, a "Columns" field for specifying columns of the specified table, a "Query" field for specifying data query parameters, and a "Load Data" button. In some embodiments, the table and column fields can be prepopulated and/or automatically populated with the available table and column options that the user has permissions to access. In various embodiments, the "Load Data" button of data query view 601 submits a specification of the data query corresponding to the provided field values of data query view 601 to the remote machine learning service in order to initiate the data request.

In response to a received data query, the corresponding machine learning service provides data query results. The data query results are received at the client and provided to the web application of user interface 600. In the example shown, data query results view 603 allows the user to view at least a portion of the data query results. For example, a table is provided that includes the appropriate header labels corresponding to the requested columns and the rows of the table include at least a portion of the retrieved data query results. In some embodiments, data query results view 603 allows the user to manipulate and navigate the data query results. For example, in various embodiments, the user can scroll and/or navigate through different sets of entries of the data query results and/or apply filters and/or searches to narrow down the displayed results. In some embodiments, the data query results are provided in a first programming language, such as a web development programming language, used at least in part to create user interface 600 and data query results view 603.

In various embodiments, program code view 605 is an interactive program code view that allows the user to load, edit, and execute user code. The user code shown in program code view 605 can further reference the retrieved query result data using a data structure of a second programming language. For example, the programming language shown in program code view 605 is a programming language used for machine learning applications (such as the Python programming language) and the data structure used to access the query result data corresponds to the variable "df" for data frame. By selecting the included "Run" button of program code view 605, the user can execute the user code shown in program code view 605 on the client device, such as within the web browser of user interface 600. In some embodiments, selecting the "Run" button will execute the program code in a virtual machine of the web browser by first converting the program code to a binary instruction format.

In various embodiments, once the user code of program code view 605 is executed, the results of execution are shown in execution results view 607 of user interface 600. As shown in the example of FIG. 6, execution results view 607 can display both text-based and graphical results. For example, execution results view 607 displays a histogram plot with results from executing the program of the user code corresponding to program code view 605. In some embodiments, the results shown in execution results view 607 can be saved, for example, to the remote machine learning service. In some embodiments, the results can be exported to the local client, such as using a PDF, PNG, SVG, or another appropriate format.

Figure 7:
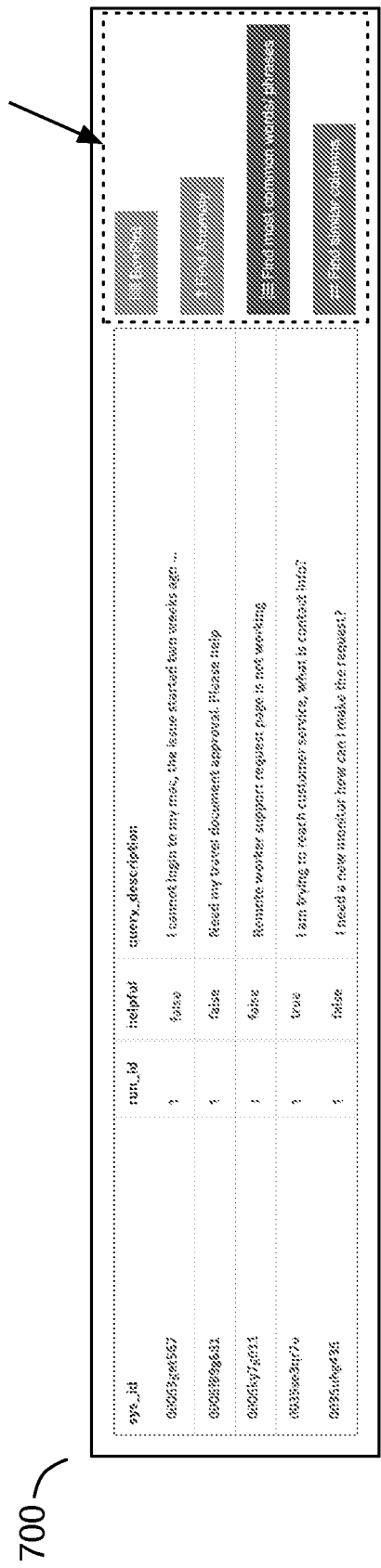
FIG. 7 is a diagram illustrating an embodiment of a user interface for performing data analysis operations within a client-side machine learning development environment.

FIG. 7 is a diagram illustrating an embodiment of a user interface for performing data analysis operations within a client-side machine learning development environment. In the example shown, user interface 700 is a section of a user interface provided by a machine learning service for performing client-side machine learning development that includes data analysis operations buttons 701. In some embodiments, the machine learning service providing at least portions of the underlying client user interface used to render user interface 700 is application and machine learning service platform 121 of FIG. 1 and the client accessing user interface 700 is one or more of clients 101, 103, and/or 105 of FIG. 1. In some embodiments, user interface 700 is implemented and/or is utilized for client-side machine learning development using the processes of FIGS. 2-5. In various embodiments, user interface 700 corresponds data query results view 603 of FIG. 6 with the addition of data analysis operations buttons 701.

In the example shown, data analysis operations buttons 701 includes four buttons, each corresponding to a different data analysis operation. The corresponding data analysis operations of data analysis operations buttons 701 include "BoxPlot," "Find Anomaly," "Find most common words/phrases," and "Find similar columns." When a user selects one of the buttons of data analysis operations buttons 701, the corresponding data analysis operation is performed on retrieved query results data. In some embodiments, the operation is configured using a machine learning programming language different from the web programming language used to create user interface 700. In various embodiments, selecting a data analysis operation button executes the program code of the operation by executing a binary version of the code in a virtual machine of the web browser. Although four data analysis operations are shown, in various embodiments, fewer, more, and/or different data analysis operations can be supported and/or configured for user interface 700.

Figure 8:
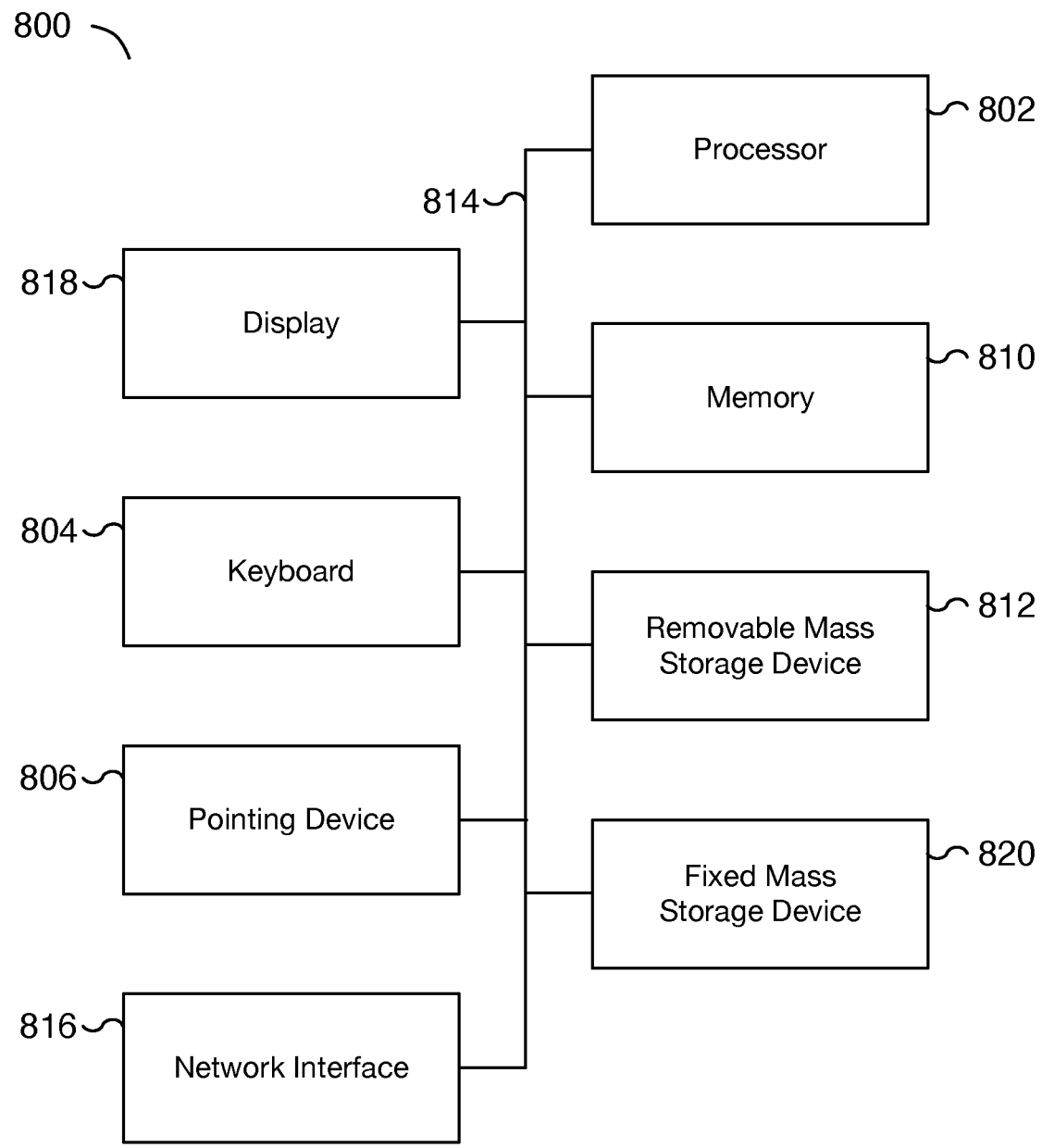
FIG. 8 is a functional diagram illustrating a programmed computer system for performing client-side machine learning development.

FIG. 8 is a functional diagram illustrating a programmed computer system for performing client-side machine learning development. As will be apparent, other computer system architectures and configurations can be utilized for performing client-side machine learning development. Examples of computer system 800 include clients 101, 103, and 105 of FIG. 1, one or more computers of application and machine learning service platform 121 of FIG. 1, and/or one or more computers of database 123 of FIG. 1. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In various embodiments, one or more instances of computer system 800 can be used to implement at least portions of the processes of FIGS. 2-5 and/or the user interfaces of FIGS. 6 and/or 7.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or unidirectional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or unidirectionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, at a client device, a specification of a data query received via a first section of a user interface;
   receiving, at the client device and using a first programming language, query result data of the data query;
   generating, at the client device and for a second programming language different from the first programming language, a data structure storing at least a portion of the query result data;
   receiving, via a second section of the user interface, a specification in the second programming language of user code utilizing the generated data structure to perform a machine learning operation; and
   executing, using client-side hardware resources of the client device and independently of server-side hardware resources of a server from which the query result data is received, a program of the user code specified in the second programming language to perform the machine learning operation using the generated data structure.

2. The method of claim 1, further comprising:
providing, via a third section of the user interface, one or more values of the query result data in a table format.

3. The method of claim 1, further comprising:
providing, via a fourth section of the user interface, results from the execution of the program of the user code.

4. The method of claim 3, wherein the results include a graphical figure.

5. The method of claim 1, wherein the execution of the program of the user code specified in the second programming language is performed within a context of a web browser application.

6. The method of claim 1, wherein executing at the client device, the program of the user code specified in the second programming language includes:
converting the user code specified in the second programming language into a binary instruction format; and
executing the binary instruction format of the user code in a virtual machine associated with a browser application.

7. The method of claim 1, wherein the machine learning operation comprises one or more matrix operations referencing the generated data structure.

8. The method of claim 1, wherein the machine learning operation comprises a classification, a clustering, or an anomaly detection on data associated with the generated data structure.

9. The method of claim 1, wherein the first programming language comprises a web development programming language, and wherein the second programming language comprises a machine learning development programming language.

10. The method of claim 1, wherein the server-side hardware resources are shared by a plurality of client devices, wherein the server is configured to use a wait queue to schedule performance of machine learning tasks by the server-side hardware resources on behalf of the plurality of client devices, and wherein the execution of the program of the user code using the client-side hardware resources occurs independent of a state of the wait queue.

11. A method comprising:
providing data that enables a user interface at a client device, wherein the user interface is configured to:
receive, at the client device, a specification of a data query received via a first section of the user interface;
receive, at the client device and using a first programming language, query result data of the data query;
generate, at the client device and for a second programming language different from the first programming language, a data structure storing at least a portion of the query result data;
receive, via a second section of the user interface, a specification in the second programming language of user code utilizing the generated data structure to perform a machine learning operation; and
execute, using client-side hardware resources of the client device and independently of server-side hardware resources of a server from which the query result data is received, a program of the user code specified in the second programming language to perform the machine learning operation using the generated data structure.

12. The method of claim 11, further comprising:
receiving a request for the data query; and
providing the query result data corresponding to the data query.

13. The method of claim 11, further comprising authenticating a user of the client device.

14. The method of claim 11, wherein the user interface is further configured to:
provide, via a third section of the user interface, one or more values of the query result data in a table format.

15. The method of claim 11, wherein the user interface is further configured to:
provide, via a fourth section of the user interface, results from the execution of the program of the user code.

16. The method of claim 15, wherein the results include a graphical figure.

17. The method of claim 11, wherein the user interface is provided via a web browser application configured to execute binary instructions in a virtual machine.

18. The method of claim 11, wherein the machine learning operation comprises one or more matrix operations referencing the generated data structure.

19. The method of claim 11, wherein the machine learning operation comprises a classification, a clustering, or an anomaly detection on data associated with the generated data structure.

20. A system comprising:
one or more processors; and
a memory coupled to the one or more processors, wherein the memory is configured to provide the one or more processors with instructions which when executed cause the one or more processors to:
provide data that enables a user interface at a client device, wherein the user interface is configured to:
receive, at the client device, a specification of a data query received via a first section of the user interface;
receive, at the client device and using a first programming language, query result data of the data query;
generate, at the client device and for a second programming language different from the first programming language, a data structure storing at least a portion of the query result data;
receive, via a second section of the user interface, a specification in the second programming language of user code utilizing the generated data structure to perform a machine learning operation; and
execute, using client-side hardware resources of the client device and independently of server-side hardware resources of a server from which the query result data is received, a program of the user code specified in the second programming language to perform the machine learning operation using the generated data structure;
receive a request for the data query; and
provide the query result data corresponding to the data query.

* * * * *